United States Patent
Tajima (10) Patent No.: US 7,869,599 B2
(45) Date of Patent: Jan. 11, 2011

(54) QUANTUM CRYPTOGRAPHY KEY DISTRIBUTING SYSTEM AND SYNCHRONIZING METHOD USED IN THE SAME

(75) Inventor: Akio Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 870 days.

(21) Appl. No.: 10/961,067

(22) Filed: Oct. 12, 2004

(65) Prior Publication Data

US 2005/0078827 A1    Apr. 14, 2005

(30) Foreign Application Priority Data

Oct. 10, 2003    (JP) .............................. 2003-351461

(51) Int. Cl.
H04K 1/00 (2006.01)
H04L 9/00 (2006.01)
G01B 9/02 (2006.01)

(52) U.S. Cl. ...................... 380/256; 380/255; 380/263; 356/450

(58) Field of Classification Search ................ 380/256, 380/255, 263; 356/450–521
See application file for complete search history.

(56) References Cited

U.S. PATENT DOCUMENTS

| | | | |
|---|---|---|---|
| 5,675,648 A * | 10/1997 | Townsend | 380/278 |
| 6,188,768 B1 | 2/2001 | Bethune et al. | |
| 6,247,138 B1 * | 6/2001 | Tamura et al. | 713/600 |
| 6,438,234 B1 * | 8/2002 | Gisin et al. | 380/256 |
| 6,529,601 B1 * | 3/2003 | Townsend | 380/256 |
| 7,006,635 B2 * | 2/2006 | Parks et al. | 380/263 |
| 7,400,724 B2 * | 7/2008 | Weinfurther et al. | 380/44 |
| 7,555,127 B2 * | 6/2009 | Nambu et al. | 380/256 |
| 7,580,524 B2 * | 8/2009 | Gisin et al. | 380/256 |
| 2003/0169880 A1 * | 9/2003 | Nambu et al. | 380/256 |

(Continued)

FOREIGN PATENT DOCUMENTS

JP    63-107323    5/1988

(Continued)

OTHER PUBLICATIONS

G. Ribordy et al., "Automated 'plug & play' quantum key distribution", Electronics Letters Oct. 29, 1998, vol. 34, No. 22, pp. 2116-2117.

(Continued)

Primary Examiner—William R Korzuch
Assistant Examiner—Sarah Su
(74) Attorney, Agent, or Firm—Young & Thompson (57) ABSTRACT

A quantum cryptography key distributing system includes an optical fiber; a transmission unit and a reception unit. The transmission unit is connected with the optical fiber, generates a transmission optical pulse signal from an optical pulse signal based on a first data in synchronism with an optical clock signal and transmits the transmission optical pulse signal to the reception unit via the optical fiber. Polarization of the transmission optical pulse signal is different from that of the optical pulse signal. The reception unit is connected with the optical fiber, transmits the optical pulse signal to the transmission unit via the optical fiber, phase-modulates a part of the transmission optical pulse signal based on a second data in synchronism with the optical clock signal, and detects a reception data corresponding to the first data based on the transmission optical pulse signal in synchronism with the optical clock signal.

23 Claims, 6 Drawing Sheets

U.S. PATENT DOCUMENTS

| | | | |
|---|---|---|---|
| 2004/0005056 A1* | 1/2004 | Nishioka et al. | 380/256 |
| 2005/0180575 A1* | 8/2005 | Maeda et al. | 380/278 |
| 2006/0018475 A1* | 1/2006 | Vig et al. | 380/256 |
| 2006/0059343 A1* | 3/2006 | Berzanskis et al. | 713/171 |
| 2007/0064945 A1* | 3/2007 | Yuan et al. | 380/263 |
| 2008/0292102 A1* | 11/2008 | Wang et al. | 380/275 |
| 2009/0196419 A1* | 8/2009 | Tapster | 380/256 |

FOREIGN PATENT DOCUMENTS

| | | |
|---|---|---|
| JP | 08-505019 | 5/1996 |
| JP | 8-154088 | 6/1996 |
| JP | 9-93233 | 4/1997 |
| JP | 2000-517499 | 12/2000 |
| JP | 2002-236271 | 8/2002 |
| JP | 2003-177078 | 6/2003 |

OTHER PUBLICATIONS

A. Muller et al., "'Plug and play' systems for quantum cryptography", Appl. Phys. Lett. vol. 70, No. 7, Feb. 17, 1997, pp. 793-795.

H. Zibinden et al. "Interferometer with Faraday mirrors for quantum cryptography", Electronics Letters, Mar. 27, 1997, vol. 33, No. 7, pp. 586-588.

* cited by examiner

QUANTUM CRYPTOGRAPHY KEY DISTRIBUTING SYSTEM AND SYNCHRONIZING METHOD USED IN THE SAME

BACKGROUND OF THE INVENTION

1. Field of the Invention

The present invention relates to a quantum cryptography key distributing system and a synchronizing method used in the same.

2. Description of the Related Art

A quantum cryptography key distributing system can detect optical interception (eavesdropping) in a high probability in communication between a transmitter unit (to be referred to as "Alice" hereinafter) and a receiver unit (to be referred to as "Bob" hereinafter) based upon the uncertainty principle by Heisenberg. Therefore, whether or not a distributed key is safe can be clearly confirmed. In other words, in the quantum cryptography key distributing system, it is possible to achieve higher security by using the distributed safe key as a key of Vernam cryptography in which absolute security is proved.

Next, as an example of distribution of a shared key in a quantum cryptography key distributing system, a case that phase interference (BB84: Bennett Brassard 84) is used will now be simply described. In this example, a "quantum channel" indicates a communication channel under very weak power condition that optical power transmitted from the Alice to the Bob is lower than or equal to 1 photon/bit, whereas a "classical channel" represents a communication channel in a usual optical power region.

Figures 1A, 1B:
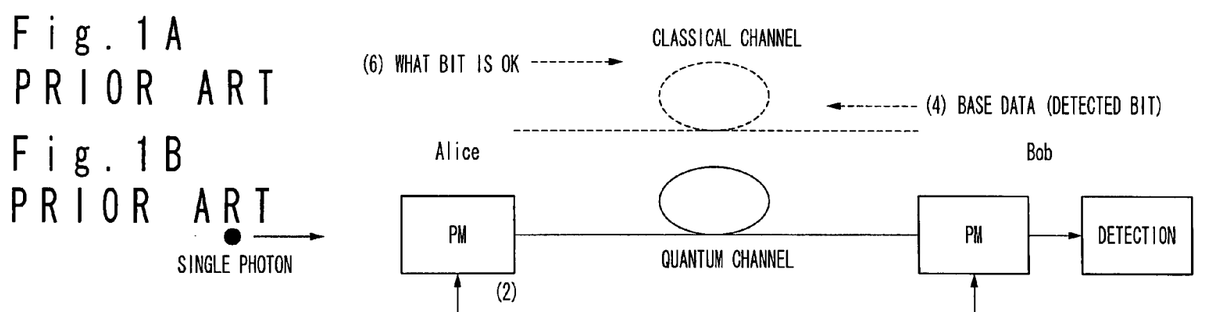
FIGS. 1A to 1C are diagrams showing an example of a distribution of a shared key in a conventional quantum cryptography key distributing system.
Figure 1C:
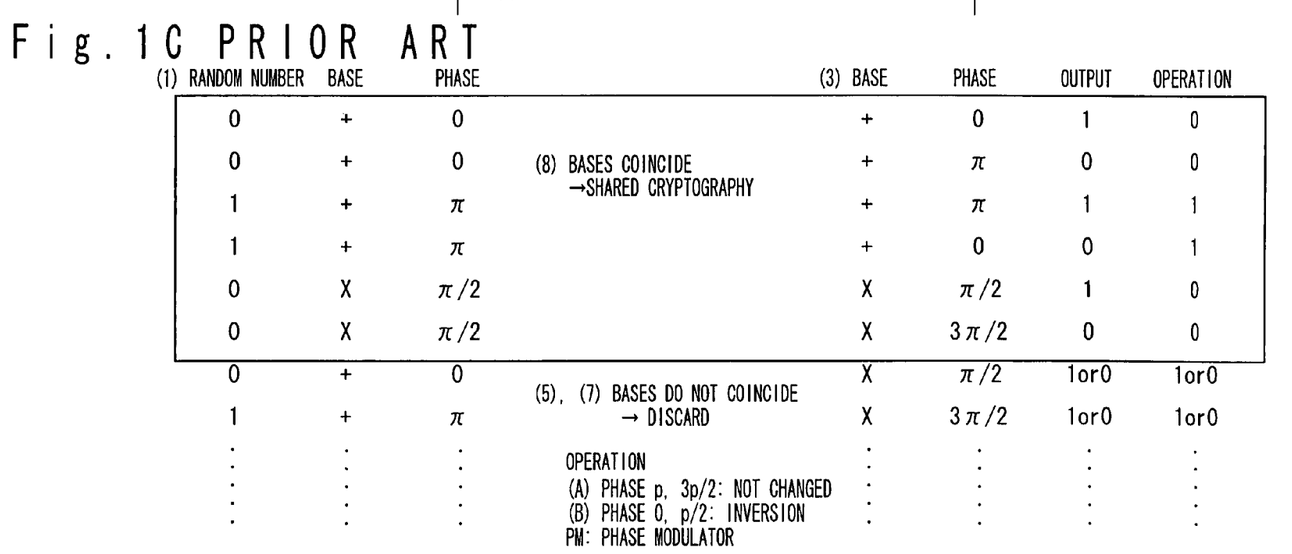

This shared key distribution is carried out as shown in FIGS. 1a to 1C.

(1) In the Alice (transmitter unit), phase-modulating data is generated based on random data bits "A" as original data of a cryptography key and a random data of bases (+base, X base) in the modulation, and the random data bits and random data are stored as a base data A.

(2) In the Alice, an optical pulse is phase-modulated based on the phase-modulating data, and then the phase-modulated optical pulses are transmitted to the Bob.

(3) In the Bob, the optical pulses transmitted from the Alice are phase-modulated based upon a random data of the bases (+base, X base), and then is received via an interferometer.

(4) In the Bob, an optical data bits "B" received in the Bob and the bases at this time are stored as a base data B, and then are transmitted to the Alice via a classical channel.

(5) In the Alice, the base data B transmitted from the Bob is compared with the stored base data A, and bits of the base data B which have bases are not coincident with the bases of the random data bits A are discarded.

(6) A bit number of each of the bits of the random data bit A, which have not been discarded is transmitted from the Alice to the Bob via the classical channel.

(7) In the Bob, the bits of the base data B corresponding to bit numbers except for the bit numbers transmitted from the Alice are discarded.

(8) The Alice and the Bob share the cryptography key. As described above, in order to share the cryptography key in both of the Alice and the Bob, establishment of synchronization in the unit of bits is necessary.

However, the quantum cryptography key distributing system is largely different from a conventional optical communication system in that a clock signal cannot be extracted by using a quantum channel, unlike the conventional optical communication, since the optical power of this quantum cryptography key distributing system is very weak to an extent of a single photon level.

Conventional quantum cryptography key distributing systems are described in many references. For instance, there are Japanese Laid Open Patent applications (JP-A-Heisei 08-505019 as a first conventional example, and JP-A-Showa 63-107323 as a second conventional example), "Automated 'plug & play' quantum key distribution" by G. Ribordy, J. D. Gautier, O. Guinnard and H. Zbinden (ELECTRONICS LETTERS, Vol. 34, No. 22, Oct. 29, 1998, pp. 2116-2117 as a third conventional example), "Plug & Play" systems for quantum cryptography" by A. Muller, T. Herzog, B. Huttner, W. Tittel, H. Zbinden and N. Gisin (Appl. Phys. Lett. 70(7), Feb. 17, 1997, pp. 793-795 as a fourth conventional example), and "interferometry with Faraday mirrors for quantum cryptography" by H. Zbinden, J. D. Gautier, N. Gisin, B. Huttner, A. Muller and W. Tittel (ELECTRONICS LETTERS, Vol. 33, No. 7, Mar. 27, 1997, pp. 586-588 as a fifth conventional example).

Figure 2:
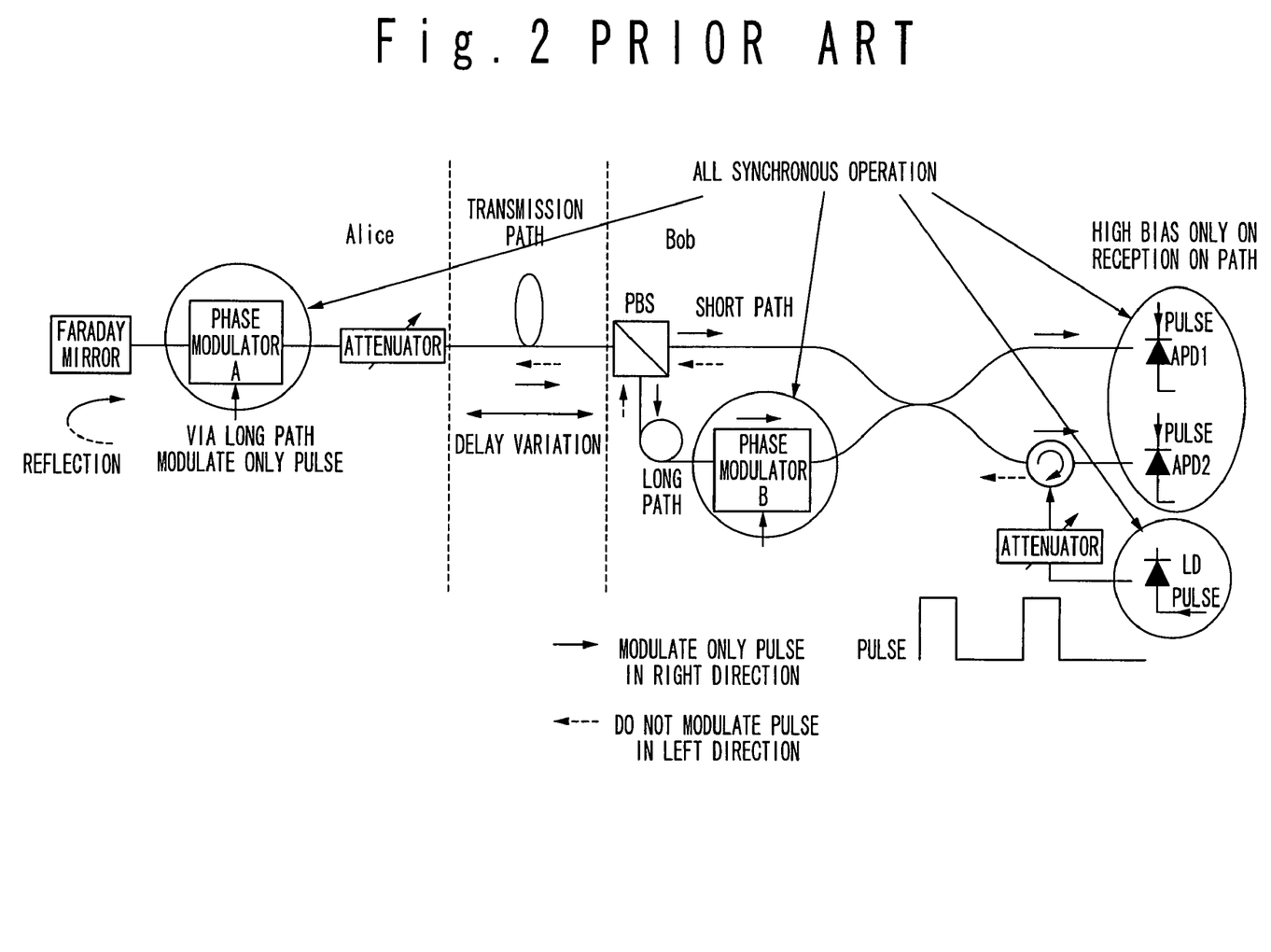
FIG. 2 is a diagram showing a conventional Plug & Play type quantum cryptography distributing system.

Of the above conventional quantum cryptography key distributing systems, a Plug & Play type quantum cryptography system proposed by Geneva University is shown in FIG. 2, and is described in the above-described third to fourth conventional examples. The Plug & Play type quantum cryptography system can compensate fluctuations of polarization in an optical fiber transfer path. Thus, the Plug & play system is expected as a system to realize a quantum cryptography key distributing system having a higher sensitivity to polarization.

In the Plug & Play system, optical pulses are transmitted from the Bob to the Alice, and the transmitted optical pulses are modulated in the Alice. Thereafter, the polarization of the optical pulses is turned by 90 degrees by a Faraday mirror, and the optical pulses are reflected to be sent back to the Bob. In the Bob, the optical pulses reflected from the Alice are phase-modulated by a phase modulator, and then interfered. Then, the optical pulses are received by a receiver. In this case, in the Bob, it is necessary in the Bob that the optical pulses transmitted to the Alice are not modulated, and the optical pulses transmitted from the Alice are modulated.

In this system, the synchronization establishments are required in the following points:

(i) when the optical pulses transmitted from the Bob are modulated (it is necessary to follow to delay variation of the optical fiber transfer path), (ii) when the optical pulses reflected from the Alice are modulated in the Bob (it is necessary to follow to delay variation of the optical fiber transfer path), and (iii) when the optical pulses are received in the Bob to make the timing of application of a bias to the receiver coincident with the optical pulses (reception in ultra high sensitivity in Geiger mode).

It should be noted in (ii) that the optical pulses to be sent to the Alice is not modulated, that is, the optical pulses transmitted from the Bob to the Alice, and the optical pulses transmitted from the Alice to the Bob are not entered to the phase modulator of the Bob at a same timing.

Also, in the quantum cryptography key distributing system, the synchronization establishment needs in the unit of bits even when the base data is transmitted and received. However, the quantum cryptography key distributing system is largely different from the conventional optical communication systems in that a clock signal cannot be extracted by using a quantum channel, since the optical power in the quantum cryptography key distributing system is very weak as much as a single photon level. As a consequence, various methods for establishing bit synchronization and frame synchronization by utilizing classical channels, and methods for calibrating a system have been proposed.

Figure 3:
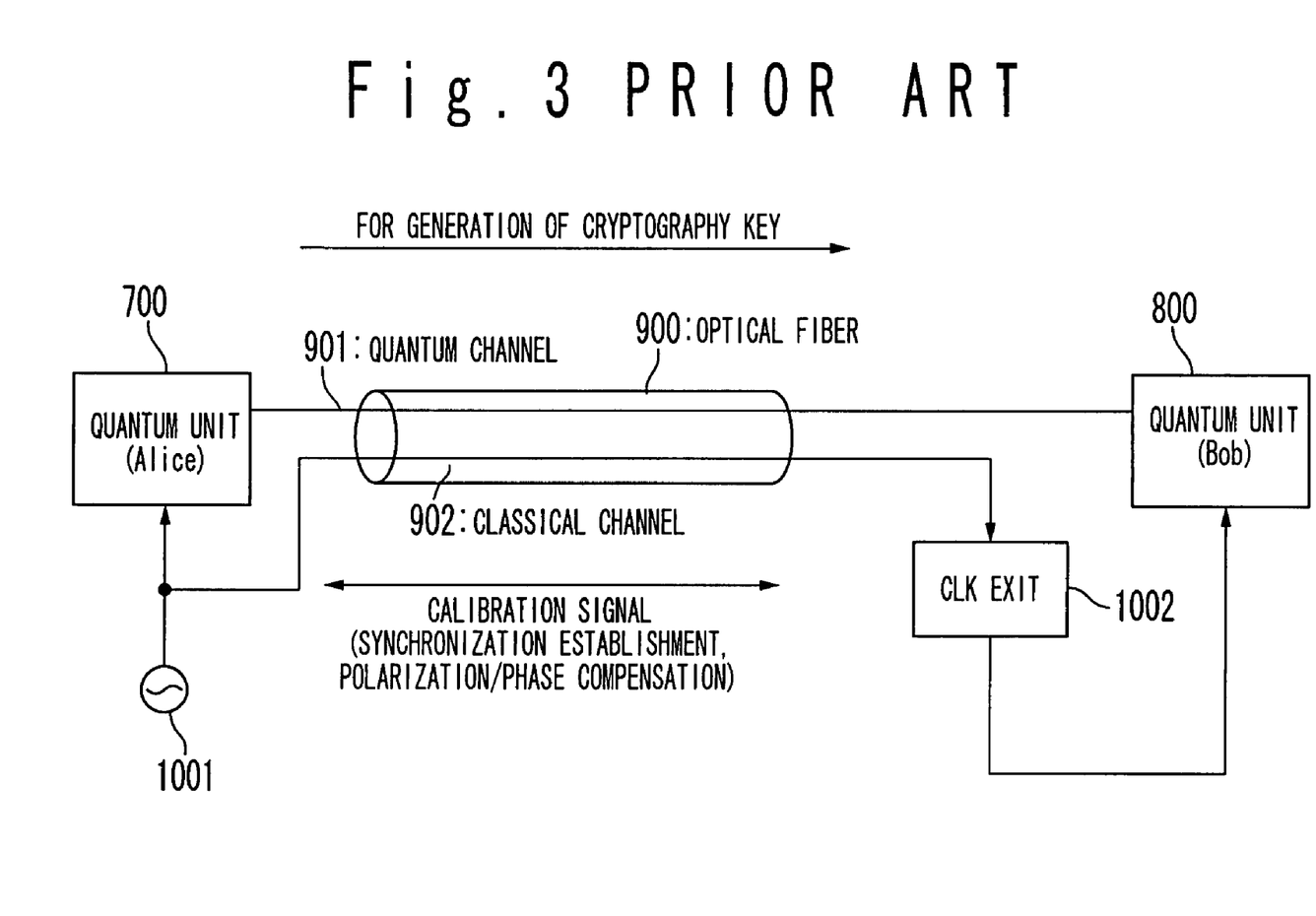
FIG. 3 is a diagram showing a conventional method of establishing synchronization.

In the method described in the first conventional example, as shown in FIG. 3, a calibration signal is transmitted from the Alice 700 to the Bob 800, and the Bob 800 can follow to the Alice 700. In a Plug & Play system, as described in the above (ii), only the optical pulses reflected from the Alice are phase-modulated in the Bob, but the optical pulses to be sent from the Bob to the Alice are not phase-modulated. In the method of the first conventional example, when a delay variation of the transfer path is caused so that the reception timings of the optical pulses reflected from the Alice are varied, the Bob can follow the change of the timings. However, the optical pulses to be sent out from the Bob to the Alice cannot be controlled at all. As a result, the optical pulses to be transmitted from the Bob to the Alice and the optical pulses transmitted from the Alice to the Bob may be possibly entered to the phase modulator of the Bob at the same timing, depending upon the delay amount of the transfer path. Therefore, the Plug & Play system cannot be realized.

In conjunction with the above description, a light transmission system is disclosed in Japanese Laid Open Patent Application (JP-A-Showa 63-107323). In the light transmission system of this conventional example, a light signal is inputted from a transmission unit to a first optical path and is received by a reception unit. A reference signal is transmitted from the reception unit to a second optical path which has the same characteristics as the first optical path is located under the same environment as in the first optical path. The transmission unit turns back the reference signal. The reception unit receives the turned-back reference signal, measures change of a light signal propagation state due to change of the state of the second optical path, and corrects a change of the light signal propagated on the first optical path based on the measured result.

Also, a phase adjustment circuit is disclosed in Japanese Laid Open Patent Application (JP-A-Heisei 8-154088). The phase adjustment circuit of this conventional example is provided in a master unit to synchronize the phase of a transmission data signal and the phase of a reception data signal, in a communication apparatus having the master unit and a slave unit which have a transmitting section and a receiving section. The phase adjustment circuit is composed of a reception frame generating section which generates a frame signal from the master unit to the slave unit, a phase comparison section which detects a phase difference of the frame signal which has been generated in the transmitting section in the master unit and the frame signal which has been generated in the reception frame generating section and is turned-back and returned from the slave unit, and a clock changing section in which a clock signal of the data signal received from the slave unit is synchronized based on a clock signal received from the slave unit and a clock signal in the master unit. The reception frame generating section adjusts the phase quantity based on the detection result by the phase comparison section such that the phase of the frame signal generated in the transmitting section of the master unit and the phase of the frame signal generated with the reception frame generating section and returned from the slave unit is coincident with each other.

Also, a data signal transmission and reception system is disclosed in Japanese Laid Open Patent Application (JP-A-Heisei 9-93233). The data signal transmission and reception system in this conventional example is composed of a receiving unit which generates a clock signal, and receives data in synchronism with the clock signal, and a transmitting unit which transmits a transmission data to the receiving unit in synchronism with the clock signal from the receiving unit. The transmitting unit turns back the clock signal to the receiving unit for a predetermined period in response to a system start, and transmits the transmission data to the receiving unit in synchronism with the clock signal. The receiving unit is composed of a phase difference detecting section which detects a phase difference between the clock signal from the transmitting unit and the clock signal generated in the receiving unit for the predetermined period, a first latch section which latches the transmission data from the transmitting unit in synchronism with the generated clock signal, a second latch section which latches the transmission data from the transmitting unit in synchronism with an inverted signal of the generated clock signal, and a selecting section selects one of an output of the first latch section and an output of the second latch section based on the detection result of the phase difference detecting section.

Also, a quantum cipher apparatus is disclosed in Japanese Laid Open Patent Application (JP-P2000-517499A). In this conventional example, communication is carried out between a first station (Alice) and a second station (Bob) by using an interference meter for quantum cryptography. At least two light pulses are transmitted through a quantum channel. In the Bob, interference of the pulses is detected. The interfering pulses (more than one) run a same arm of the interference meter and are delayed when running the above quantum channel, in anther sequence. The pulses are reflected by Faraday mirrors provided on the both edges of the above quantum channel so as for influence of the polarization to be cancelled. In this system, the alignment and the adjustment of balance are not necessary between the arms of the interference meter. Also, the station can be used in such a manner of the Plug and Play.

Also, a light time-division multiplexer is disclosed in Japanese Laid Open Patent Application (JP-P2002-236271A). In the light time-division multiplexer of this conventional example, an N-channel light branching filter inputs a light pulse string of a repetition frequency f0 and separates it into N channels (N is an integer equal to or more than 2). N light modulators input a light modulation signal in synchronism with the light pulse string and modulates an intensity or a phase of the light pulse string of a corresponding channel into a light signal sequence of a bit rate f0. An N-channel light combining unit combines the light signal sequences outputted from the light modulators. N optical waveguides connect the N-channel light branching filter and the N-channel light combining unit in different route lengths so as to give different delays the light signal sequences of the respective channels respectively. The N-channel light branching filter, the N light modulators, the N-channel light combining unit, and the N optical waveguides are provided on a substrate. The light time-division multiplexer outputs a multiple light signal sequence with the bit rate of N*f0 from the N-channel light combining unit. Each of the light modulators forms a symmetrical Mach-Zehnder-type interference section composed of a light branching filter which branches the light pulse string to two semiconductor light amplifiers which are inserted into two routes, two semiconductor light amplifiers inserted in the two routes, and a light combining unit which combines the outputs of the semiconductor light amplifiers. A modulation signal is supplied to one of the semiconductor light amplifiers via a light modulation signal light combining unit which is inserted in one of the routes. Thus, the phase-modulated light pulse string and the non-phase-modulated light pulse string are outputted from the two semiconductor light amplifiers, and an intensity-modulated light signal string for the light modulation signal is outputted from the light combining unit.

Also, a dispersion measuring method is disclosed in Japanese Laid Open Patent Application (JP-P2003-177078A). In the dispersion measuring method of this conventional example, a wavelength modulating unit modulates a light signal with a period f1 and a wavelength modulation quantity $\Delta\lambda$, and the wavelength-modulated light signal is subjected to a data modulation based on an input signal in a light modulating unit and outputted as a light output signal. The light output signal is converted into an electric signal by a photoelectric converting unit, and the electric signal is separated into a clock signal and an output signal by a clock extracting unit. A reference timing signal generating circuit generates a reference timing signal which is synchronized with the clock signal during a period other than a measurement period and has a phase immediately before the measurement period during the measurement period. A phase detecting unit outputs a constant phase difference during the period other than the measurement period and a phase difference which varies in accordance with the modulation by the wavelength modulating unit. A dispersion detecting unit detects a dispersion value based on the phase difference.

SUMMARY OF THE INVENTION

An object of the present invention is to provide a quantum cryptography key distributing system and a synchronizing method used in the same, in which synchronization between a transmitter unit and a receiver unit is established, and a phase relationship between an optical pulse to be transmitted from the receiver unit and another optical pulse received by the receiver unit can be always kept constant.

In an aspect of the present invention, a quantum cryptography key distributing system includes an optical fiber; a transmission unit and a reception unit. The transmission unit is connected with the optical fiber, generates a transmission optical pulse signal from an optical pulse signal based on a first data in synchronism with an optical clock signal and transmits the transmission optical pulse signal to the reception unit via the optical fiber. Polarization of the transmission optical pulse signal is different from that of the optical pulse signal. The reception unit is connected with the optical fiber, transmits the optical pulse signal to the transmission unit via the optical fiber, phase-modulates a part of the transmission optical pulse signal based on a second data in synchronism with the optical clock signal, and detects a reception data corresponding to the first data based on the transmission optical pulse signal in synchronism with the optical clock signal.

Here, the transmission unit may include a transmission side phase modulator which phase-modulates optical pulse signal based on the first data in synchronism with the optical clock signal; and a Faraday mirror which rotates the polarization of the phase-modulated optical pulse signal by 90 degrees to generate the transmission optical pulse signal.

Also, the reception unit may include a polarization beam splitter which splits the transmission optical pulse signal into first and second components; a reception side phase modulator which phase-modulates the first component as the part of the transmission optical pulse signal based on the second data in synchronism with the optical clock signal; an optical coupler which combines the phase-modulated first component and the second component; and a detecting section which detects the reception data based on the combined components in synchronism with the optical clock signal. In this case, the reception unit may further include a short path provided between the polarization beam splitter and the optical coupler to transfer the second component; and a long path provided between the polarization beam splitter and the reception side phase modulator to transfer the first component. Also, the optical coupler may separate an original optical pulse signal into third and fourth components respectively corresponding to first and second components. The third component is transferred to the polarization beam splitter via the short path, and the fourth component is transferred to the polarization beam splitter via the reception side phase modulator and the long path. The reception side phase modulator passes the fourth component without phase-modulation. The polarization beam splitter combines the third and fourth components to generate the optical pulse signal.

Also, the optical fiber has a quantum channel on which the optical clock signal and the transmission optical clock signal are transferred, and a classical channel on which the optical clock signal and the returned optical clock signal are transferred. The reception unit generates the optical clock signal based on the optical clock signal and the returned optical clock signal and transmits the optical clock signal to the transmission unit via the classical channel. In this case, a frequency of the optical clock signal is controlled such that a number of clocks in the classical channel is always positive constant number even if a delay of the classical channel varies.

Also, the transmission unit may further include a frequency divider which frequency-divides the optical clock signal; and a transmission side quantum cryptography key generator which generates the first data as a quantum cryptography key in response to the frequency-divided optical clock signal. The reception unit may further include a reception side quantum cryptography key generator which generates the second data as a quantum cryptography key in response to the frequency-divided optical clock signal transmitted from the transmission unit via the optical fiber.

In another aspect of the present invention, a synchronizing method is achieved by (a) establishing clock synchronization between a transmission unit and a reception unit; by (b) transmitting an optical pulse signal from the reception unit to the transmission unit via a optical fiber; by (c) generating a transmission optical pulse signal from the optical pulse signal by changing polarization of the optical pulse signal and transmitting the transmission optical pulse signal from the transmission unit to the reception unit via the optical fiber; and by (d) detecting the transmission optical pulse signal through interference between components of the transmission optical pulse signal.

The (a) establishing clock synchronization may be achieved by transmitting an optical clock signal from the reception unit to the transmission unit via a classical channel of the optical fiber; by reflecting the optical clock signal from the transmission unit to the reception unit via the classical channel of the optical fiber as a returned optical clock signal; and by controlling a frequency of the optical clock signal based on the optical clock signal and the returned optical clock signal. In this case, a frequency of the optical clock signal is controlled such that a number of clocks in the classical channel is always positive constant number even if a delay of the classical channel varies.

Also, the (c) generating may be achieved by phase-modulates optical pulse signal based on the first data in synchronism with the optical clock signal; and by rotating polarization of the phase-modulated optical pulse signal by 90 degrees by a Faraday mirror to generate the transmission optical pulse signal.

Also, the (d) detecting may be achieved by splitting the transmission optical pulse signal into first and second components by a polarization beam splitter; by phase-modulating the first component as the part of the transmission optical pulse signal based on the second data in synchronism with the optical clock signal by a reception side phase modulator; by combining the phase-modulated first component and the second component by an optical coupler such that the phase-modulated first component and the second component interfere with each other; and by detecting the reception data based on the combined components in synchronism with the optical clock signal. In this case, the (d) detecting may be achieved by further including transferring the second component on a short path between the polarization beam splitter and the optical coupler; and transferring the first component on a long path between the polarization beam splitter and the reception side phase modulator. Also, the (b) transmitting an optical pulse signal may be achieved by generating original optical pulse signal in the reception unit; separating the original optical pulse signal into third and fourth components respectively corresponding to first and second components by the optical coupler; by transferring the third component to the polarization beam splitter on the short path; by transferring the fourth component to the polarization beam splitter via the reception side phase modulator on the long path, wherein the reception side phase modulator passes the fourth component without phase-modulation; and by combining the third and fourth components by the polarization beam splitter to generate the optical pulse signal.

Also, said (d) detecting may be achieved by phase-modulating a part of the transmission optical pulse signal based on a second data in synchronism with the optical clock signal; and by detecting a reception data corresponding to the first data based on the transmission optical pulse signal in synchronism with the optical clock signal. In this case, the synchronizing method may be achieved by further including frequency-dividing the optical clock signal; generating the first data as a quantum cryptography key in response to the frequency-divided optical clock signal; generating the second data as a quantum cryptography key in response to the frequency-divided optical clock signal transmitted from the transmission unit via the optical fiber.

In another aspect of the present invention, a quantum cryptography key distributing system includes an optical fiber; a transmission unit connected with the optical fiber; and a reception unit connected with the optical fiber. The transmission unit receives an optical pulse signal and an optical clock signal from the reception unit via the optical fiber, and generates a transmission optical pulse signal having polarization different from that of the optical pulse signal, based on the optical pulse signal and a first cryptography data in synchronism with the optical clock signal. The reception unit detects a reception data corresponding to the first cryptography data based on the transmission optical pulse signal and a second cryptography data in synchronism with the optical clock signal.

In another aspect of the present invention, a quantum cryptography key distributing system includes an optical fiber; a transmission unit connected with the optical fiber; and a reception unit connected with the optical fiber. The transmission unit receives an optical pulse signal and an optical clock signal from the reception unit via the optical fiber, and generates a transmission optical pulse signal from the optical pulse signal in synchronism with the optical clock signal. The reception unit detects the transmission optical pulse signal through interference between components of the transmission optical pulse signal in synchronism with the optical clock signal.

DESCRIPTION OF THE PREFERRED EMBODIMENTS

Hereinafter, a quantum cryptography key distributing system will be described in detail with reference to the attached drawings.

Figure 4:
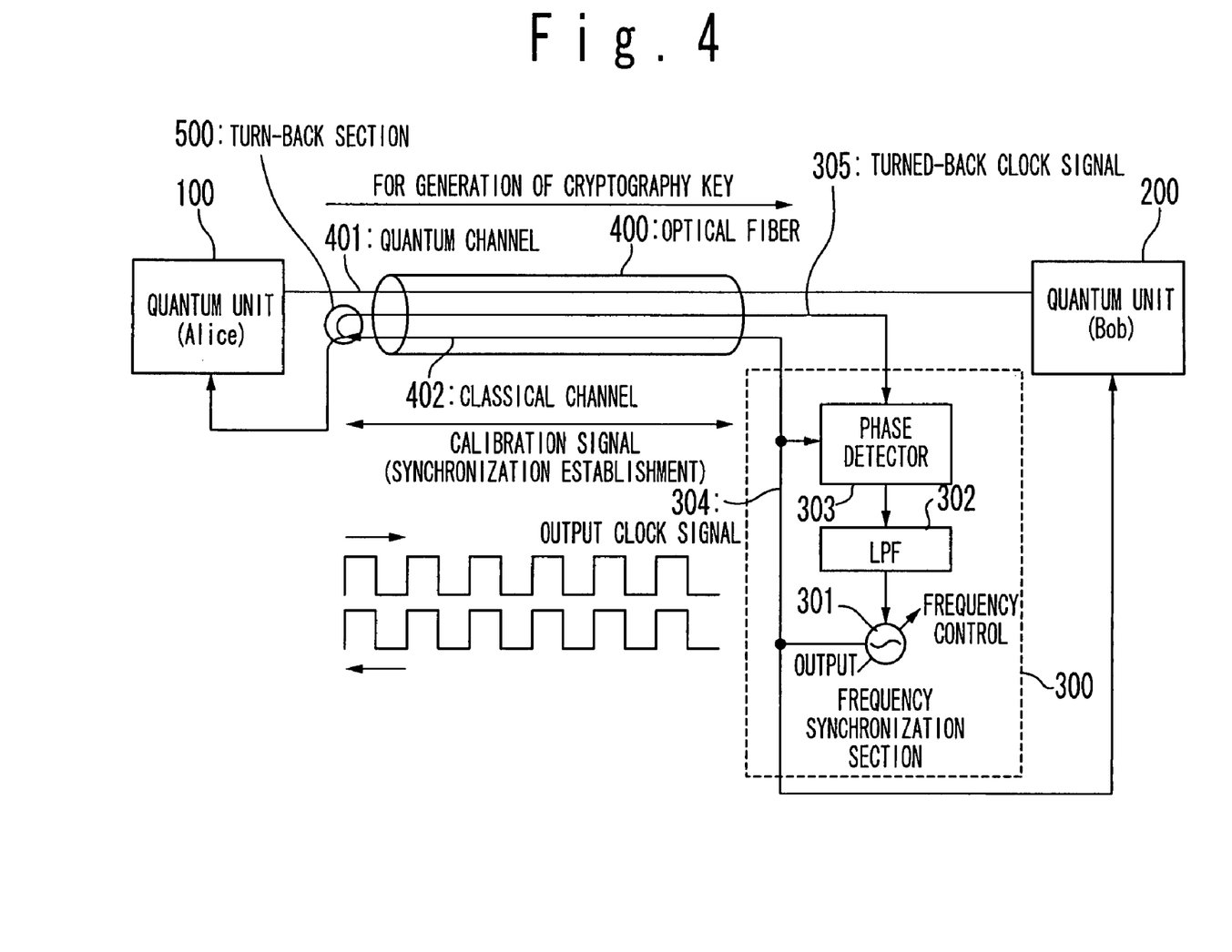
FIG. 4 is a block diagram principally showing the configuration of a quantum cryptography key distributing system according to a first embodiment of the present invention.

FIG. 4 is a schematic block diagram showing the configuration of the quantum cryptography key distributing system according to the first embodiment of the present invention. In FIG. 4, the quantum cryptography key distributing system in the first embodiment is composed of a quantum unit 100 as a transmission end to be referred to as "Alice" hereinafter, another quantum unit 200 of a reception end to be referred to as "Bob" hereinafter, and an optical fiber 400. The Bob contains a frequency synchronizing unit 300, and the Alice contains a turn back section 500. The optical fiber 400 provides a transfer path that connects the Alice 100 and the Bob 200 with each other. Both of the Alice 100 and the Bob 200 cooperate to generate a cryptography key via a quantum channel 401 of the optical fiber 400. The frequency synchronizing unit 300 is composed of a voltage-controlled oscillator (VCO) 301, a low-pass filter (LPF) 302, and a phase detector (Phase Det) 303.

An optical output clock signal 304 is outputted from the frequency synthesizing unit 300 and is transmitted to the Alice 100 via a classical channel 402 of the optical fiber 400. At the same time, the output clock signal 304 is supplied to the phase detector 303. The output clock signal 304 is turned back by the turn-back section 500, and then the turned-back output clock signal 305 is again transmitted to the Bob 200 via the classical channel 402 of the optical fiber 400, and supplied to the phase detector 303. At this time, in the Bob 200, a phase difference between the output clock signal 304 and the turned-back output clock signal 305 which is returned from the Alice 100 is detected by the phase detector 303. The phase detector 303 generates a phase difference signal based on the detected phase difference to output to the low-pass filter 302. The low-pass filter 302 filters this phase difference signal to cut off a high frequency component therefrom. Then, the filtered signal is supplied to the voltage-controlled oscillator 301 to control the output clock signal. According to this system, the synchronization between the Alice 100 and the Bob 200 can be established via the optical fiber 400, and moreover it is possible to realize that the number of clocks of the clock signal between the Alice 100 and the Bob 200 is equal to a constant positive number.

Figure 5:
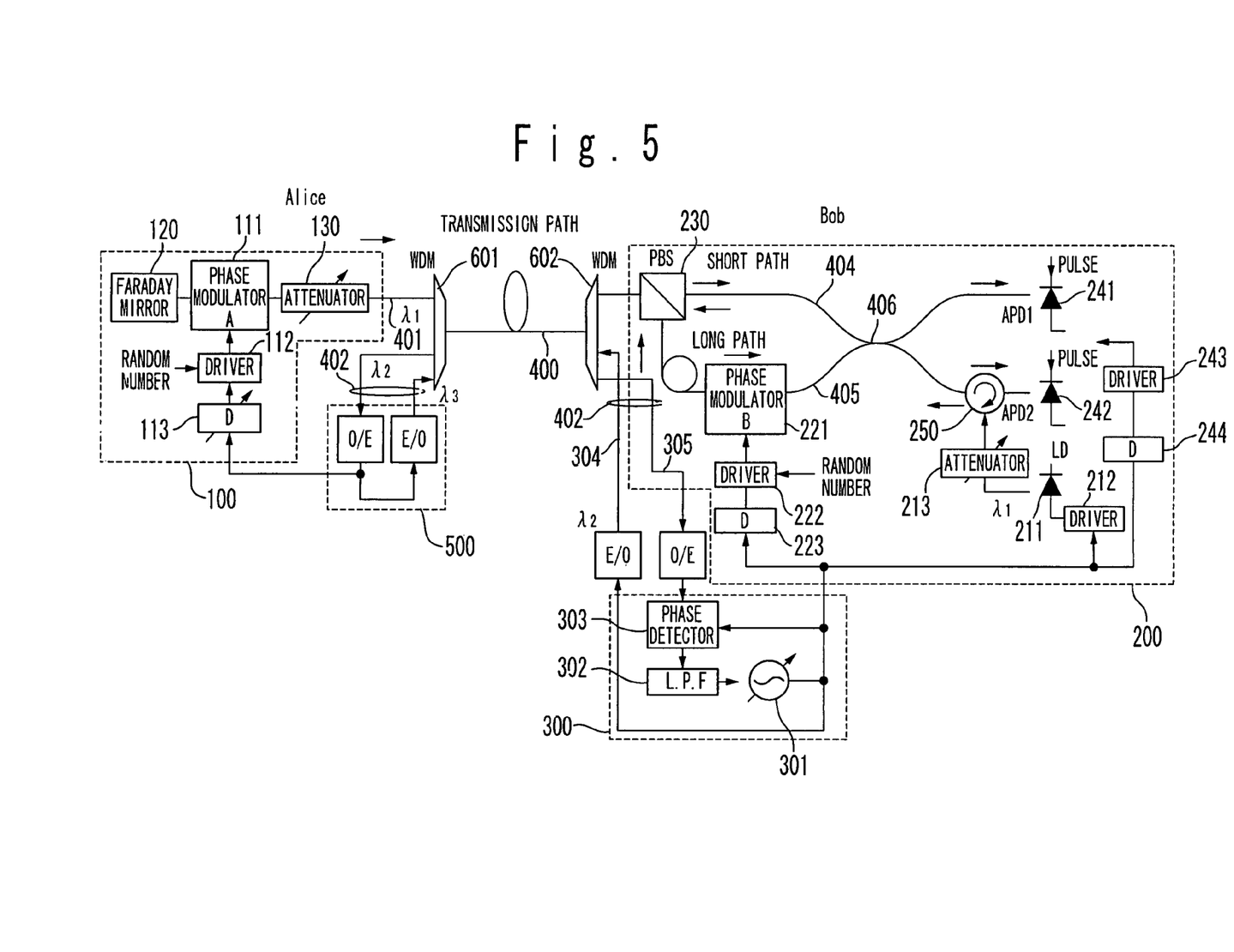
FIG. 5 is a block diagram showing a configuration example of the quantum cryptography key distributing system according to a second embodiment of the present invention.

FIG. 5 is a block diagram showing the configuration of the quantum cryptography key distributing system according to the second embodiment of the present invention. It should be noted that the quantum channel 401 uses a wavelength of "λ1" and the classical channel 402 for transferring the synchronization clock signal uses wavelengths of "λ2" and "λ3" which are different from the above-described wavelength of "μ1". Both of the Alice 100 and the Bob 200 are connected with the optical fiber transfer path 400 via a wavelength multiplexing/demultiplexing unit 601 and another wavelength multiplexing/demultiplexing unit 602, respectively.

The Alice 100 is composed of a phase modulator (phase Mod. A) 111, a modulator driver 112, a delay adjusting circuit (D) 113, a Faraday mirror 120, an optical attenuator 130, and the turn-back section 500. The Bob 200 is composed of a laser diode (LD) 211 functioning as a pulse light source, a laser driver 212, an optical attenuator 213, an optical coupler 406, an optical circulator 250, a short path 404, a long path 405, a phase modulator B 221, a modulator driver 222, a delay adjusting circuit (D) 223, a PBS (Polarization Beam Splitter) 230, APDs (Avalanche Photo-Diodes) 241 and 242, an APD biasing driver 243, and another delay adjusting circuit (D) 244. The Bob 200 is further composed of the frequency synchronizing unit 300. Thus, in the second embodiment, phase synchronization is established in addition to the clock synchronization. It should be noted that the above-mentioned short path 404 and long path 405 are fibers of a polarization maintaining type, and both of the optical circulator 250 and the optical coupler 406 are of the polarization maintaining type.

The laser diode 211 functions as the pulse light source and outputs optical (laser) pulses in synchronism with a clock signal supplied from the frequency synchronizing unit 300. The optical pulses are attenuated by the attenuator 213 and then supplied to the optical coupler 406 through the optical circulator 250. The optical pulses are separated into the short path 404 and the long path 405 by the optical coupler 406. Then, the separated optical pulses are optically multiplexed by the PBS 230, and the optically multiplexed optical pulses are transmitted to the Alice 100 through the wavelength multiplexing/demultiplexing unit 602, the optical fiber 400, and the wavelength multiplexing/demultiplexing unit 601. At this time, in the phase modulator 221, the delay adjusting unit 223 is set such that the phase modulator 221 does not carry out a phase modulating operation.

In the Alice 100, the optically multiplexed optical pulses are supplied to the phase modulator 111 via the attenuator 130. At this time, only the optical pulses which has been transferred via the long path 405 of the Bob 200 are phase-modulated by the phase modulator 111. A signal for driving the phase modulator 111 is synchronized with a clock signal which is supplied from the turn-back section 500. Since the clock signal is synchronized with the frequency synchronizing unit 300 of the Bob 200 and also follows a delay variation of the optical fiber 400, it is possible to carry out the phase modulation by the phase modulator 111 in synchronism with the optical pulses arrived at the Alice 100 in response to the clock signal.

The phases of the optical pulses are rotated by 90 degrees by the Faraday mirror 120 so that the optical pulses are reflected, and then the power of the reflected optical pulses are attenuated to a power lower than or equal to 1 photon/bit by the optical attenuator 130. Thereafter, the power-attenuated optical pulses are sent out to the optical fiber 400 via the wavelength multiplexing/demultiplexing unit 601. The optical pulses which have transferred through the optical fiber 400 are received by the wavelength multiplexing/demultiplexing unit 602 and enters the Bob 200.

The optical pulses are split to the short path 404 and the long path 405 by the PBS 230. At this time, since the phases of the optical pulses have been turned by 90 degrees by the Faraday mirror 120 when these optical pulses are transmitted from the Bob 200 to the Alice 100, the optical pulses which have passed through the short path 404 passes through the long path 405, whereas the optical pulses which have passed through the long path 405 passes through the short path 404. Since the phase modulator 221 is inserted into the long path 405, the optical pulses which have passed through the short path 404 when the optical pulse is transmitted from the Bob 200 to the Alice 100, are modulated by the phase modulator 221. In other words, the optical pulses which have passed through the long path 405 when the optical pulses are transmitted from the Bob 200 to the Alice 100, are phase-modulated in the Alice 100, whereas the optical pulses which have passed through the short path 404 when the optical pulses are transmitted from the Bob 200 to the Alice 100, are phase-modulated in the Bob 200.

Path lengths when the optical pulses go and go back are same to the optical pulses which have passed through the long path 405 and the optical pulses which have passed through the short path 404 when the optical pulses are transmitted from the Bob 200 to the Alice 100. Therefore, both of the optical pulses are entered to the optical coupler 406 at the same time, so that these optical pulses may interfere with each other. If the modulated phase in the Alice 100 is identical to the modulated phase in the Bob 200, the optical pulse is outputted to the APD 241, whereas if the phase difference between these optical pulses is equal to "π", the optical pulses are outputted to the APD 242.

These states indicate that the bases are same between the Alice 100 and the Bob 200. On the other hand, when the phase difference is equal to either $\pi/2$ or $3\pi/2$, the optical pulses are not exclusively defined. In these states, the bases of the Alice 100 are not coincident with the bases of the Bob 200.

Since a signal for driving the phase modulator 221 of the Bob 200 is synchronized with the frequency synchronizing unit 300, the phase modulator 221 can carry out the phase modulating operation in synchronism with the optical pulse having the delay variation in the optical fiber 400. The quantum cryptography key distributing system is so arranged as to carry out a frequency control operation in such a manner that a timing between the clock signal which is sent out from the Bob 200 to the Alice 100 and the clock signal which is returned from the Alice 200 to the Bob 100 may always become constant. Therefore, if the phase modulator 221 is initially set such that the phase modulator 221 phase-modulates only the returned optical pulses, the same state can be maintained even when the delay in the optical fiber 400 is varied.

Since the APD biasing driver 243 is also synchronized with the frequency synchronizing unit 300, the APD biasing circuit 243 can bias the APDs 241 and 242 in synchronism with the optical pulses influenced by a delay variation occurred in the optical fiber transfer path 400.

As described above, in accordance with this embodiment, the synchronization can be established between the Alice 100 and the Bob 200. Also, the phase relationship between the optical pulses outputted from the Bob 200 and the optical pulses returned from the Alice 100 to the Bob 200 can be always made constant. As a consequence, in this embodiment, both of the Alice 100 and the Bob 200 can be operated in synchronism with each other, and further only the optical pulses returned from the Alice 100 can be modulated by the phase modulator 221 in the Bob 200. Thus, the quantum cryptography key distributing system of the Plug & Play type can be realized.

Figure 6:
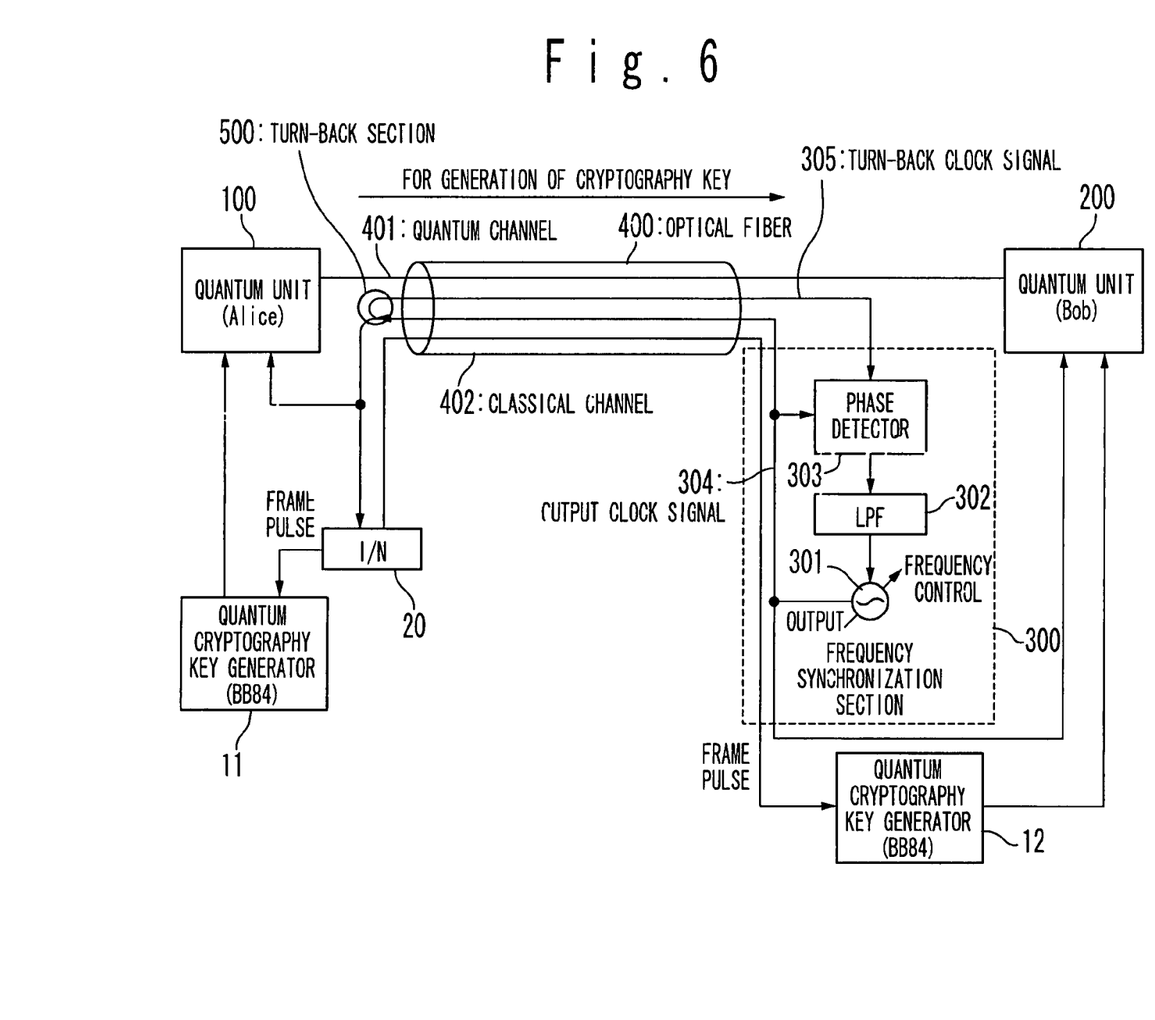
FIG. 6 is a diagram showing the configuration of the quantum cryptography key distributing system according to a third embodiment of the present invention.

FIG. 6 is a schematic block diagram showing the configuration of the quantum cryptography key distributing system according to the third embodiment of the present invention. In FIG. 6, in the quantum cryptography key distributing system according to the second embodiment, frame synchronization can be realized in a cryptography key producing stage as well as the clock synchronization. That is to say, the configuration of the quantum cryptography key distributing system according to the second embodiment of the present invention shown in FIG. 6 is similar to the configuration of the quantum cryptography key distributing system according to the first embodiment of the present invention shown in FIG. 4. The second embodiment is different from the first embodiment in that a frequency divider (1/N) 20 and a quantum cryptography key generator 11 are added to the Alice, and another quantum cryptography key generator 12 is added to the Bob. It should be noted that the same reference numerals shown in FIG. 4 will be employed as those for denoting the same structural elements in FIG. 6. In the second embodiment, the quantum cryptography key generators 11 and 12 are operated based upon the quantum cryptography key distributing system (BB84: Bennett Brassard 84), as shown in FIGS. 1A to 1C.

The quantum cryptography key distributing system of the second embodiment is arranged in such a manner that not only the clock synchronization can be established, but also the frame synchronization can be established in the cryptography key producing stage, in which transmission/reception of base data are carried out between the Alice and the Bob, and bits whose bases are not coincident with each other are discarded, as shown in FIGS. 1A to 1C. The frame synchronization is required for matching the bits to be compared with each other.

Also, in the second embodiment, the clock signal synchronized by way of the method as described in FIG. 4 is frequency-divided by the frequency divider 20 of the Alice to generate a frame pulse. Then, since the frame pulse is transmitted from the Alice to the Bob separately from the clock signal, the frame synchronization is established.

According to the present invention, the following effects can be achieved. That is, the synchronization between the transmitter unit and the receiver unit is established, and a phase relationship between an optical pulses which are outputted from the receiver unit and the optical pulses which are returned from the transmitter unit to the receiver unit can be always kept constant.

The present invention can be applied to such data communication fields that higher security is required, for example, defense fields, diplomatic fields, financial fields, and the like. Also, the present invention may be similarly applied to a method for detecting a phase synchronization based on signals obtained by frequency-dividing basis frequency by "N."

What is claimed is:

1. A quantum cryptography key distributing system comprising:
   an optical fiber;
   a transmission unit which is connected with said optical fiber, generates a transmission optical pulse signal from an optical pulse signal based on a first data in synchronism with an optical clock signal and transmits said transmission optical pulse signal to a reception unit via said optical fiber, wherein polarization of said transmission optical pulse signal is different from that of said optical pulse signal, and optical pulses reflected in the transmission unit are modulated in the reception unit; and
   said reception unit which is connected with said optical fiber, transmits said optical pulse signal to said transmission unit via said optical fiber, phase-modulates a part of said transmission optical pulse signal based on a second data in synchronism with said optical clock signal, and detects a reception data corresponding to said first data based on said transmission optical pulse signal in synchronism with said optical clock signal, such that phase synchronization is established in addition to the clock synchronization,
   wherein the quantum cryptography key distribution system is configured such that the phase synchronization is established by a reception unit-transmission unit-reception unit loop.

2. The quantum cryptography key distributing system according to claim 1, wherein said transmission unit comprises:
   a transmission side phase modulator which phase-modulates the optical pulse signal based on said first data in synchronism with said optical clock signal; and
   a Faraday mirror which rotates a polarization of the phase-modulated optical pulse signal by 90 degrees to generate said transmission optical pulse signal.

3. The quantum cryptography key distributing system according to claim 1, wherein said reception unit comprises:
   a polarization beam splitter which splits said transmission optical pulse signal into first and second components;
   a reception side phase modulator which phase-modulates said first component as said part of said transmission optical pulse signal based on said second data in synchronism with said optical clock signal;
   an optical coupler which combines said phase-modulated first component and said second component; and
   a detecting section which detects said reception data based on said combined components in synchronism with said optical clock signal.

4. The quantum cryptography key distributing system according to claim 3, wherein said reception unit further comprises:
   a short path provided between said polarization beam splitter and said optical coupler to transfer said second component; and
   a long path provided between said polarization beam splitter and said reception side phase modulator to transfer said first component.

5. The quantum cryptography key distributing system according to claim 4, wherein said optical coupler separates an original optical pulse signal into third and fourth components respectively corresponding to the first and second components,
   said third component is transferred to said polarization beam splitter via said short path,
   said fourth component is transferred to said polarization beam splitter via said reception side phase modulator and said long path,
   said reception side phase modulator passes said fourth component without phase-modulation, and
   said polarization beam splitter combines said third and fourth components to generate said optical pulse signal.

6. The quantum cryptography key distributing system according to claim 1, wherein said optical fiber has a quantum channel on which said optical clock signal and a transmission optical clock signal are transferred, and a classical channel on which said optical clock signal and a returned optical clock signal are transferred, said reception unit generates said optical clock signal based on said optical clock signal and said returned optical clock signal and transmits said optical clock signal to said transmission unit via said classical channel.

7. The quantum cryptography key distributing system according to claim 6, wherein a frequency of said optical clock signal is controlled such that a number of clocks in said classical channel is always positive constant number even if a delay of said classical channel varies.

8. The quantum cryptography key distributing system according to claim 1, wherein said transmission unit further comprises:

a frequency divider which frequency-divides said optical clock signal; and a transmission side quantum cryptography key generator which generates said first data as a first quantum cryptography key in response to said frequency-divided optical clock signal, said reception unit further comprises:

a reception side quantum cryptography key generator which generates said second data as a second quantum cryptography key in response to said frequency-divided optical clock signal transmitted from said transmission unit via said optical fiber.

9. The quantum cryptography key distributing system according to claim 1, wherein the synchronization is established when a signal is superposed on light received from a receiver in the transmission unit;

the synchronization is established such that modulation is not carried out to the optical pulse signal transmitted to the transmission unit when the reception data is randomly modulated in the receiver; and the synchronization is established when a high bias gating signal is applied to a reception device according to the reception data in the reception unit.

10. A synchronizing method comprising:

(a) establishing clock synchronization and a phase synchronization between a transmission unit and a reception unit;

(b) transmitting an optical pulse signal from said reception unit to said transmission unit via an optical fiber;

(c) generating a transmission optical pulse signal from said optical pulse signal by changing polarization of said optical pulse signal and transmitting said transmission optical pulse signal from said transmission unit to said reception unit via said optical fiber, and optical pulses reflected in the transmission unit are modulated in the reception unit; and (d) detecting said transmission optical pulse signal through interference between components of said transmission optical pulse signal, wherein the phase synchronization is established by a reception unit-transmission unit-reception unit loop.

11. The synchronizing method according to claim 10, wherein said (a) establishing clock synchronization comprises:

transmitting an optical clock signal from said reception unit to said transmission unit via a classical channel of said optical fiber;

reflecting said optical clock signal from said transmission unit to said reception unit via said classical channel of said optical fiber as a returned optical clock signal; and controlling a frequency of said optical clock signal based on said optical clock signal and said returned optical clock signal.

12. The synchronizing method according to claim 11, wherein said controlling comprises:

controlling the frequency of said optical clock signal such that a number of clocks in said classical channel is always positive constant number even if a delay of said classical channel varies.

13. The synchronizing method according to claim 10, wherein said (c) generating comprises:

phase-modulates the optical pulse signal based on a first data in synchronism with an optical clock signal; and rotating polarization of the phase-modulated optical pulse signal by 90 degrees by a Faraday mirror to generate said transmission optical pulse signal.

14. The synchronizing method according to claim 13, wherein said (d) detecting comprises:

phase-modulating a part of said transmission optical pulse signal based on a second data in synchronism with said optical clock signal; and detecting a reception data corresponding to said first data based on said transmission optical pulse signal in synchronism with said optical clock signal.

15. The synchronizing method according to claim 14, further comprising:

frequency-dividing said optical clock signal;

generating said first data as a first quantum cryptography key in response to said frequency-divided optical clock signal; and generating said second data as a second quantum cryptography key in response to said frequency-divided optical clock signal transmitted from said transmission unit via said optical fiber.

16. The synchronizing method according to claim 10, wherein said (d) detecting comprises:

splitting said transmission optical pulse signal into the first and second components by a polarization beam splitter;

phase-modulating said first component as part of said transmission optical pulse signal based on a second data in synchronism with an optical clock signal by a reception side phase modulator;

combining said phase-modulated first component and said second component by an optical coupler such that said phase-modulated first component and said second component interfere with each other; and detecting reception data based on said combined components in synchronism with said optical clock signal.

17. The synchronizing method according to claim 16, wherein said (d) detecting further comprises:

transferring said second component on a short path between said polarization beam splitter and said optical coupler; and transferring said first component on a long path between said polarization beam splitter and said reception side phase modulator.

18. The synchronizing method according to claim 17, wherein said (b) transmitting the optical pulse signal comprises:

generating original optical pulse signal in said reception unit;

separating said original optical pulse signal into third and fourth components respectively corresponding to the first and second components by said optical coupler;

transferring said third component to said polarization beam splitter on said short path;

transferring said fourth component to said polarization beam splitter via said reception side phase modulator on said long path, wherein said reception side phase modulator passes said fourth component without phase-modulation; and combining said third and fourth components by said polarization beam splitter to generate said optical pulse signal.

19. The synchronizing method according to claim 10, wherein the synchronization is established when a signal is superposed on light received from a receiver in the transmission unit;

the synchronization is established such that modulation is not carried out to the optical pulse signal transmitted to the transmission unit when the reception data is randomly modulated in the receiver; and the synchronization is established when a high bias gating signal is applied to a reception device according to the reception data in the reception unit.

20. A quantum cryptography key distributing system comprising:

an optical fiber;

a transmission unit connected with said optical fiber; and a reception unit connected with said optical fiber, wherein said transmission unit receives an optical pulse signal and an optical clock signal from said reception unit via said optical fiber, and generates a transmission optical pulse signal having polarization different from that of said optical pulse signal, based on said optical pulse signal and a first cryptography data in synchronism with said optical clock signal, and optical pulses reflected in the transmission unit are modulated in the reception unit, and said reception unit detects a reception data corresponding to said first cryptography data based on said transmission optical pulse signal and a second cryptography data in synchronism with said optical clock signal, such that phase synchronization is established in addition to the clock synchronization, wherein the quantum cryptography key distribution system is configured such that the phase synchronization is established by a reception unit-transmission unit-reception unit loop.

21. The quantum cryptography key distributing system according to claim 20, wherein the synchronization is established when a signal is superposed on light received from a receiver in the transmission unit;

the synchronization is established such that modulation is not carried out to the optical pulse signal transmitted to the transmission unit when the reception data is randomly modulated in the receiver; and the synchronization is established when a high bias gating signal is applied to a reception device according to the reception data in the reception unit.

22. A quantum cryptography key distributing system comprising:

an optical fiber;

a transmission unit connected with said optical fiber; and a reception unit connected with said optical fiber, wherein said transmission unit receives an optical pulse signal and an optical clock signal from said reception unit via said optical fiber, and generates a transmission optical pulse signal from said optical pulse signal in synchronism with said optical clock signal, and optical pulses reflected in the transmission unit are modulated in the reception unit, and said reception unit detects said transmission optical pulse signal through interference between components of said transmission optical pulse signal in synchronism with said optical clock signal, such that phase synchronization is established in addition to the clock synchronization, wherein the quantum cryptography key distribution system is configured such that the phase synchronization is established by a reception unit-transmission unit-reception unit loop.

23. The quantum cryptography key distributing system according to claim 22, wherein the synchronization is established when a signal is superposed on light received from a receiver in the transmission unit;

the synchronization is established such that modulation is not carried out to the optical pulse signal transmitted to the transmission unit when the reception data is randomly modulated in the receiver; and the synchronization is established when a high bias gating signal is applied to a reception device according to the reception data in the reception unit.

* * * * *